Patented Sept. 5, 1950

2,521,361

UNITED STATES PATENT OFFICE 2,521,361

PLASTICIZED COPOLYMER COMPOSITIONS AND PROCESS OF PRODUCING SAME

Albert M. Gessler, Cranford, N. J., assignor to Standard Oil Development Company, a corporation of Delaware No Drawing. Application December 10, 1947, Serial No. 790,935

13 Claims. (Cl. 260—32.4)

This invention relates to synthetic rubber compositions and more particularly relates to plasticized diolefin-aromatic olefin copolymer compositions and plasticized diolefin-olefin copolymer compositions and methods of producing such plasticized compositions.

It is generally recognized that synthetic rubber-like copolymers are more difficult to process than natural rubber because the synthetic copolymers are extremely difficult to masticate to a soft and plastic condition which is necessary for proper compounding and processing into desired articles. In order to overcome this difficulty it has been necessary to add softeners and plasticizers to these synthetic rubber-like materials to improve their compounding and processing characteristics. It has generally been thought that softeners and plasticizers which are soluble or compatible with the synthetic rubber-like materials must be used. Use of soluble plasticizers such as dibutyl phthalate and similar materials have not resulted in the desired improved processing characteristics.

According to this invention diolefin-aromatic olefin copolymers and diolefin-olefin copolymers are plasticized by using low molecular weight normally liquid butadiene-acrylonitrile copolymers (very viscous liquids, or semi-solids, not free flowing like water) which are preferably made by an emulsion process. The low molecular weight oily diolefin-acrylonitrile copolymer is not miscible with the rubber-like copolymer to be plasticized and does not have a solvating action on the rubber-like polymer but does have a plasticizing effect on the said copolymer.

In the prior art it is suggested that limited miscibility of the plasticizer in the rubber-like polymers is undesirable because it is said that the plasticizer would exude or sweat out from the polymers on standing. This is true if the fluidity of the plasticizer is great enough to allow for its migration, by diffusion, through the molecular network of the high polymer system. By proper selection of the viscosity of the plasticizer, it has been found that such migration is reduced to such a low magnitude that the plasticizing material does not exude or sweat out.

The synthetic rubber-like materials which are to be plasticized according to this invention comprise diolefin-aromatic olefin copolymers prepared by an emulsion process from a major proportion of a conjugated diolefin, such as butadiene or isoprene, or other diolefins having 4 to 6 carbon atoms per molecule and a minor proportion of styrene or substituted styrenes, such as alpha methyl styrene, para methyl styrene, 2,4-dichlorostyrene, and the like.

This invention is also applicable to rubbery polymers formed from $C_4$ to $C_{10}$ diolefins, such as butadiene-1,3, isoprene, piperylene, dimethyl butadiene, etc., and a $C_4$–$C_7$ olefin, such as isobutylene as set forth in Thomas et al. Patent 2,356,128, issued August 22, 1944.

The emulsion process for preparing the butadiene-styrene type copolymers is well known and will only be briefly referred to. A latex is prepared by polymerizing a reactant mixture of a major proportion of a butadiene and a minor proportion of a styrene in the ratio of about 3:1 in aqueous emulsion using 2:1 ratio of water to reactants with about 2½% by weight of a soap as an emulsifier, 0.25% by weight of a mixture of $C_{12}$ to $C_{14}$ aliphatic mercaptans as polymerization modifiers and about 0.2% of potassium persulfate as catalyst. The percentages given are based on the water present in the emulsion. The proportions may be varied and other emulsifiers, modifiers and catalysts may be used as is well known in the art. The mixture is polymerized to about 70–80% conversion to polymer, the butadiene is then flashed off and a stabilizer, such as phenyl beta naphthylamine, is added. The latex is then stripped of monomeric styrene. The temperature during the reaction is about 45 to 50° C., although with suitable activators lower temperatures may be used.

The latex is coagulated by concentrated sodium chloride solutions or other brines, the polymer particles filtered and dried at a temperature of about 90 to 110° C. and are then ready for further processing in accordance with this invention.

The low molecular weight normally liquid oily butadiene-acrylonitrile copolymer which is used as the plasticizer is preferably made by an emulsion process as set forth in copending application filed June 11, 1946, for Newberg et al. and bearing Serial Number 676,120. A major proportion of $C_4$–$C_6$ conjugated diolefin, such as butadiene, isoprene, piperylene, methyl pentadiene and dimethyl butadiene, and a minor proportion of a nitrile of a low molecular weight unsaturated fatty acid, such as acrylonitrile or methacrylonitrile, are mixed in aqueous emulsion in the presence of 3 to 12% by weight on the monomers of an aliphatic mercaptan of 6 to 16 carbon atoms. Tertiary mercaptans are preferred to primary and secondary mercaptans but all three types may be used. For example, 3 to 8% by weight of tertiary mercaptans derived from the dimer of isobutylene may be used or about 5 to 10% by weight of the tertiary mercaptan derived from the trimer of isobutylene or 7 to 12% by weight of tertiary mercaptan derived from the tetramer of isobutylene may be used. Preferably, the tertiary mercaptans prepared from diisobutylene (dimer of isobutylene) are used. Other modifying agents, such as alkyl xanthogen polysulfides, may be used, but these are less desirable since they decrease the reaction rate very appreciably. Modifiers may be added all at once at the beginning of the polymerization, continuously during the polymerization or only part may be added at first and the rest added portion-wise or at a later time during the reaction.

It is also preferable but not essential to use highly unsaturated fatty acids, such as those obtained from linseed or soy bean oils, for the preparation of soap emulsifiers. By using such soaps it is possible to reduce the amount of mercaptans or other modifiers used in the reaction. The amount of emulsifier is about 0.25 to 5% by weight and the amount of polymerization catalyst which may be potassium persulfate is about 0.1 to 1% by weight based on the monomers. Other catalysts, such as hydrogen peroxide, alkali metal persulfates or perborates and ammonium persulfate or perborate may be used. The polymerization is carried out at about 30 to 35° C. but temperatures as low as 10° C. may be used.

The dienes which are used in the preparation of the low molecular weight plasticizer comprise $C_4$–$C_6$ diolefins, such as butadiene 1,3, isoprene, piperylene, methyl pentadiene, dimethyl butadiene, etc. The nitrile may be acrylonitrile or methacrylonitrile or the like.

The copolymers prepared from mixtures containing 60 to 80% of the diolefin and from 40 to 20% of the nitrile may be used in this invention. The copolymer containing 25 to 30% of acrylonitrile is the preferred one and may be prepared as follows:

74 parts by weight of butadiene
26 parts by weight of acrylonitrile
4 parts by weight of sodium soap of tallow acids
6 parts by weight of octyl mercaptan
0.3 part by weight of potassium persulfate
200 parts by weight of water The above mixture is heated at about 30° C. for 17 hours in a pressure bottle while shaking to form a latex. The latex is stabilized by the addition of 0.5% by weight based on the polymer of 2,6-di-tertiary butyl para cresol. The latex is coagulated with 200 parts by weight of sodium chloride brine, washed with isopropyl alcohol and water and then dried at about 125° C. A normally liquid viscous oil is obtained in a yield equivalent to about 79% of the monomers of the feed. The product which is liquid at normal temperatures contained about 28% of combined acrylonitrile and had an intrinsic viscosity of about 0.18. These viscous oily copolymers useful in this invention are oily liquids even when the reaction is carried to 80 to 90% monomer conversion and have intrinsic viscosities between about 0.15 and 0.60.

(1) The intrinsic viscosity is determined as follows:

$$[N] = \frac{lnNr}{c}$$

where

[N]—intrinsic viscosity
ln—natural logarithm
Nr—relative viscosity and is the ratio of $$\frac{t \text{ solution}}{t \text{ solvent}}$$

when determining time for the solution of the polymer and the solvent to flow through an orifice.
c—concentration in grams per 100 cc. benzene and should be about 0.5 to 1.5 grams.

(2) The molecular weight is calculated from the intrinsic viscosity as follows:

$$[N] = 4.9 \times 10^{-4} M^{0.64}$$

where M equals molecular weight.

The M so calculated is approximately the true number average molecular weight and is roughly ten times the Staudinger numbers frequently quoted as molecular weights.

(3) Using the equation given under (2), an intrinsic viscosity range of 0.15–0.6 would correspond to a molecular weight range of about 7,400–69,000.

The kinematic viscosity of the viscous oil used in the examples below was 6,700 centistokes at 212° F. and its intrinsic viscosity was 0.18. The kinematic viscosity may vary from 5000 to 20,000 centistokes at 212° F. The oily viscous copolymer having kinematic viscosities between 5000 to 10,000 centistokes at 212° F. are preferred in this invention.

The oily low molecular weight diene-nitrile plasticizing material above described may be incorporated in the rubbery copolymer on an ordinary open mill, on a calender, in an extruder, in a Banbury mixer or the like. Instead of adding the plasticizer to the dried rubbery material, the oily low molecular weight plasticizer is made in emulsion form and may be added in the emulsion form to the butadiene-styrene copolymer also in emulsion form or in latex form so that upon coagulation of the mixture with sodium chloride brine or the like the plasticizer is distributed in the rubbery copolymer and there is obtained a very uniform mixture of plasticizer in the diolefin-styrene copolymer.

In working up butadiene-styrene copolymers with formerly used plasticizers it has been ordinarily necessary to first subject the copolymer to mastication in a Banbury mixer for several minutes to break down the copolymer and to cause it to band readily on a mill. After this preliminary mastication, a small portion of the softener or plasticizer was added and the mill or mixer was again operated for a few minutes. The addition of the plasticizer caused lacing and breaking apart of the copolymer on the mill. Additional amounts of plasticizer could only be added after other compounding ingredients and further mixing and working was effected. Specifically this applies to the addition of dibutyl phthalate to the butadiene-styrene copolymer and the time of adding the dibutyl phthalate increases almost linearly with the amount added or concentrated in the copolymer.

The following data compare the plasticizing or processing effect of dibutyl phthalate in which GR–S (butadiene-styrene copolymer) is soluble and oily viscous butadiene acrylonitrile copolymer which is insoluble or immiscible with GR–S copolymer. The oily viscous butadiene-acrylonitrile polymer used in this work was made by the emulsion process as set forth above and contained about 72% butadiene and 28% acrylonitrile and had an intrinsic viscosity of about 0.18 and a kinematic viscosity of about 6700 centistokes at 212° F.

The GR–S copolymer was made by an emulsion process and contained approximately 75% butadiene, 25% styrene, and had a Mooney viscosity of 50 as determined at 100° C.

The oily low molecular weight butadiene-acrylonitrile copolymer will be referred to in the following data as "Oily Polymer." The amounts of plasticizer and GR–S are parts by weight.

These mixtures were prepared on a 6" x 12" laboratory mill operating at a 1:1.4 speed ratio.

other premastication treatments. The plasticizer used in this invention is a very viscous liquid or semi-solid at an ordinary temperature and may be added rapidly to the rubbery polymer on the mill. This oily plasticizing polymer used in the above cited examples is a very viscous liquid with the consistency of heavy honey or molasses. Dibutyl phthalate, on the other hand, is a low viscosity liquid not much more viscous than water, the viscosity of dibutyl phthalate being 2.3 centistokes at 212° F.

As has just been pointed out, the rapid addition of a plasticizer to a rubber on a mill is a function of the viscosity of the plasticizer and does not depend to a great extent on solubility therein. The smoothness of the band on the mill and the activity of the bank, on the other hand, depend completely on solubility characteristics. The GR–S (butadiene-styrene rubbery copolymer) - oily polymer blends were characterized by good

|  | A-1780-1 | A-1782-1 | A-1782-2 | A-1782-3 | A-1782-4 | A-1782-5 |
|---|---|---|---|---|---|---|
| GR-S | 100.0 | 100.0 | 100.0 | 100.0 | 100.0 | 100.0 |
| Dibutyl Phthalate | 0 | 5.0 | 10.0 | 15.0 | 20.0 | 25.0 |

|  | A-1950-1 | A-1950-2 | A-1950-3 | A-1950-4 | A-1950-5 |
|---|---|---|---|---|---|
| GR-S | 100.0 | 100.0 | 100.0 | 100.0 | 100.0 |
| Oily Polymer | 5.0 | 10.0 | 15.0 | 20.0 | 25.0 |

There was no evidence in all of the A–1950 blends that a condition of incompatibility existed.

The mixtures of the polymer systems just given were prepared as stated above and the time to complete the mix is indicated in minutes below:

```
                                                        Total
                                                        Time
A-1782-1 ⎫                 ⎧Softener added in 3¼'---  7¼'
A-1782-2 ⎪                 ⎪Softener added in 5'-----  9
A-1782-3 ⎬Polymer banded in 4'⎨Softener added in 6½'--- 10½'
A-1782-4 ⎪                 ⎪Softener added in 7½'---  11½'
A-1782-5 ⎭                 ⎩Softener added in 9¼'---  13¼'
A-1950-1 ⎫                 ⎧Oily polymer added in 1½'  1½'
A-1950-2 ⎪Oily polymer added to⎨----do----------------  1½'
A-1950-3 ⎬GR-S directly with-  ⎪----do----------------  1½'
A-1950-4 ⎪out previous forma-  ⎨Oily polymer added in 2'  2
A-1950-5 ⎭tion of band.        ⎩----do----------------  2
```

In order to get rid of all holes in the 100% GR–S polymer band, the polymer had to be milled 8 minutes. The milling in the above data started at 95–100° F. Cooling water was kept on throughout the milling. The final temperature was about 115° F. to 125° F. The 100% GR–S polymer was milled for 15 minutes like the other systems for purposes of comparison as will be hereinafter pointed out.

Addition of dibutyl phthalate to GR–S (butadiene-styrene copolymer) on an open mill was difficult. The matrix polymer had to be banded thoroughly first, since even small portions of the softener or plasticizer when added caused the polymer to break apart and lace. The time to add dibutyl phthalate increased almost linearly with its concentration. The GR–S (butadiene-styrene rubbery copolymer) on the mill banded momentarily, then after a half minute or so laced due to heat buildup. After 4 minutes, the band was again formed with only small holes in it. The oily polymer used as the plasticizer was added directly to the matrix polymer, the addition having been started before the lacing began.

A great advantage in saving time is obtained when a plasticizer can be added directly to an unbanded or untreated rubbery polymer on a mill. It allows for the elimination of breakdown and mill behavior. The bank was in all cases active and rolling; a sheet cut from the mill was very smooth and showed relatively no elastic shrinkage. The elastic-plastic characteristics of the polymer systems, will now be described.

After the various polymer-plasticizer systems or mixtures which have been shown above had been made and the time data had been collected, each stock was milled again for varying periods to obtain for all a constant period of about 15 minutes of mechanical treatment.

The relative elastic-plastic properties of the systems already prepared will now be discussed. The plasticity of the polymer composition has an important bearing upon the rate at which it can be extruded, i. e., the length of product extruded per unit of time, and the dimensional stability of the extruded product. The dimensional stability is a property of great importance since it is obviously desirable and necessary that the compound be readily fabricated dimensionally within the limits of the specifications. The question of shape and final dimension of the extruded products is dependent wholly on the elastic-plastic properties of the polymer system being handled.

The distortion of an extruded item as it issues from the die of the extruder is dependent on its tendency to recover from the deformation induced, i. e., on the development of the reversible, high elastic component of its deformation. This component attains full development slowly, particularly if the stock is allowed to cool. In many instances where the extruded item is passed directly into a cold water quench trough, the development of the high elastic component is arrested sharply and the rubber retains its shape until it is again heated during the early stages of vulcanization and the recovery can continue to completion. In order to allow for the full development of this high-elastic component of deformation, i. e., for complete lateral swell and longitudinal shrinkage, all the tubes formed in the experiments described below were given a 10 minute heat treatment immediately following their extrusion.

The extrusion experiments described below were carried out with the use of a #½ Royle extruder. The machine was set in such a way that the worm turned 80 revolutions per minute and steam was supplied to the head and barrel so that both were maintained at 220° F. A threaded die with an inside forming diameter of 0.4 inch was fastened to the head of the extruder over a core bridge fixed with a core whose outside forming diameter was 0.3 inch. The extruded article, therefore, was a tube having a theoretical outside diameter of 0.4 inch and a theoretical wall thickness of 0.05 inch.

For the test work, stock sheeted from a mill and cut in thin strips was fed into the extruder. The initially formed tube collected at the head of the machine was fed back to the worm for a second pass to insure equilibrium thermal conditions throughout. On the third pass through the tuber, duplicate sections of the tube were taken every 30 seconds until two nearly perfect checks were obtained. From the extruder, the two tube sections were taken directly to an air oven maintained at about 220° F. and allowed to rest for ten minutes on a liberally talced base. After the heat period, the tubes were cooled for five minutes at room temperature and their weight and length measured. From the specific gravity of the stock, and the measurements of weight and length taken, the volume in cubic centimeters per inch of the tube was calculated. A material, if it were completely plastic, would extrude exactly to die dimensions and would have a volume per inch of 0.9 cc. This value, therefore, would be the ideal value representing the case of purely plastic behavior; elastic tendencies of the polymer systems would result in tube volumes which would be larger than this ideal value, the elastic tendency being proportional to the volume increase. This expression of volume shows in precise, quantitative terms the swell of the various polymer-plasticizer systems tested.

The results of the above tests are given in Table 1, wherein the post extrusion swell of the tube is expressed (as the volume per inch of extruded material) as a function of the plasticizer concentration. The GR–S polymer is 100 parts by weight in each case and the plasticizers are in parts by weight.

*Table 1*

| Polymer, 100 parts by weight | Dibutyl Phthalate, parts by wt. | Oily Polymer, parts by wt. | Volume in cc. per inch of extruded material |
|---|---|---|---|
| GR-S | 0 | 0 | 2.9 |
|  | 5 | ------- | 2.9 |
|  | 10 | ------- | 2.9 |
|  | 15 | ------- | 3.0 |
|  | 20 | ------- | 3.1 |
|  | 25 | ------- | 3.1 |
|  | ------- | 5 | 2.2 |
|  | ------- | 10 | 2.0 |
|  | ------- | 15 | 1.8 |
|  | ------- | 20 | 1.6 |
|  | ------- | 25 | 1.5 |

Taking first the blends containing the solvent or miscible plasticizer, dibutyl phthalate, the elasticity of the resulting system, as judged by the swell of the formed tube, has been increased. The dibutyl phthalate, being of low viscosity, has apparently acted solely as a softener to decrease the viscosity of the resulting blends, and, as a result of this fact, not much work was done on the mixtures during the extrusion operation. With the immiscible plasticizer, the low molecular weight oily polymer (butadiene-acrylonitrile), the elasticity of the resulting systems has decreased rapidly with increasing concentrations of the plasticizer. The excellent processing properties which naturally originate from this decreased elasticity would show up as well in all fabrication operations. Calendered sheets, for example, have been found to be smooth and to show a minimum of post calender shrinkage tendencies.

Furthermore, the extruded tubes from the mixtures containing dibutyl phthalate were of irregular outer contour, the tube wall was thick and the central hole was small and irregularly shaped (pentagonal from the spider), whereas the extruded tubes from the mixtures containing the oily low molecular weight polymer plasticizer had a much smoother outer contour (especially those using 10 or more parts of plasticizer), a thin tube wall with a circular central opening.

To further develop these extrusion results and to show that they are not just functions of the rate of flow of material through the extruder the following data are given:

| Material | Rate of Extrusion, Inches/Min. | Material | Rate of Extrusion, Inches/Min. |
|---|---|---|---|
| A-1732-1 | 38.5 | A-1950-1 | 56.3 |
| A-1732-2 | 39.0 | A-1950-2 | 58.0 |
| A-1732-3 | 38.5 | A-1950-3 | 68.0 |
| A-1732-4 | 39.4 | A-1950-4 | 81.0 |
| A-1732-5 | 39.9 | A-1950-5 | 88.8 |

For a given polymer or polymer system, the swell, as a result of elastic behavior, of the formed tube would increase as the rate of extrusion increased. In this case all systems were tubed using a constant speed of 80 R. P. M. on the extruder worm screw. From these facts, then, it is even more striking that the GR–S polymer-low molecular weight oily polymer systems show such a drastic reduction in elastic quality when at the same time the rate of passage through the extruder increases so sharply.

As previously stated, the plasticizers of this invention are also useful in plasticizing polydiene-olefin rubbery copolymers such as the isobutylene-diolefin copolymers. Such a copolymer was prepared as follows: 97 parts of isobutylene and 3 parts of isoprene were dissolved in 150 parts of methyl chloride and cooled to a temperature of −100° C. by external cooling with ethylene. Catalyst consisting of a 0.5% solution of aluminum chloride in methyl chloride was added with good agitation until a conversion of approximately 70% of theory was obtained. The reaction mixture was quenched by pouring into boiling water, and the rubbery particles slurried with approximately 2% of zinc stearate and 0.25% of phenyl beta naphthylamine. The polymer crumbs were filtered and dried. The raw polymer had a Mooney viscosity of about 45 at 100° C.

The diolefin-isoolefin rubbery copolymer prepared as above, was mixed with plasticizers on a 6″ x 12″ laboratory mill operated at a 1:1.4 speed ratio and at substantially the same temperatures as above described in connection with the butadiene-styrene copolymer. The following mixtures were prepared with the different amounts of plasticizers set forth below, the GR–I being the isobutylene-isoprene rubbery copolymer and the oily polymer being the same as above described in connection with the butadiene-styrene copolymer.

| | A-1946-1 | A-1946-2 | A-1946-3 | A-1946-4 | A-1946-5 |
|---|---|---|---|---|---|
| GR-I | 100.0 | 100.0 | 100.0 | 100.0 | 100.0 |
| Hydrocarbon solvent | 0.0 | 5.0 | 10.0 | 15.0 | 20.0 |

| | A-1947-1 | A-1947-2 | A-1947-3 | A-1947-4 |
|---|---|---|---|---|
| GR-I | 100.0 | 100.0 | 100.0 | 100.0 |
| Oily Polymer | 5.0 | 10.0 | 15.0 | 20.0 |

The hydrocarbon oil—Zerice 42—is a solvent for the GR-I rubber and has the following properties: A. P. I. gravity of 24.3°, flash point of 355° F., Saybolt Universal viscosity of 158.7 at 100° F. and 41.7 at 210° F., and an aniline point of 173° F. The oily polymer is a low molecular weight butadiene-acrylonitrile copolymer which has an intrinsic viscosity of about 0.18 and is immiscible with GR-I rubber. Butyl requires no premastication treatment; 100% butyl milled for same time as other systems.

Addition of the hydrocarbon solvent to the matrix polymer on the mill was difficult. As is usual in the case of low viscosity ester plasticizers, the material had to be added very slowly to prevent the stock from breaking apart or lacing. The total time to complete the incorporation of the hydrocarbon solvent was proportional to its concentration. The oily polymer could be added very rapidly to the isobutylene-isoprene copolymer (GR-I) rubber on the mill. No lacing tendencies were encountered. The time to make the addition remained constant for all practical purposes, over the range of concentrations shown.

After the plasticizers had been incorporated with the polymer, milling was continued in each case for varying intervals so that each system was given the same overall mechanical treatment.

It was desired to show the relative elasticity of the two types of systems shown above. For this purpose, the extrusion plasticity test described above in connection with the butadiene-styrene copolymer was used. In this test, the rubbery polymers were extruded under very carefully controlled conditions to form a tube.

The results of these tests are given in Table 2 wherein the post extrusion swell of the tube expressed as the volume per inch is compared with the plasticizer concentration and type.

Table 2

| Polymer, 100 parts by wt. | Hydrocarbon solvent, parts by wt. | Oily Polymer, parts by wt. | Volume in cc. per inch of extruded material |
|---|---|---|---|
| GR-I | 0 | | 3.3 |
| | 5 | | 3.2 |
| | 10 | | 3.3 |
| | 15 | | 3.4 |
| | 20 | | 3.3 |
| | | 5 | 2.8 |
| | | 10 | 2.6 |
| | | 15 | 2.1 |
| | | 20 | 1.8 |

Taking first the blends containing the hydrocarbon solvent plasticizer, it can be seen that the distortion of the formed tube has become somewhat greater as the concentration of the plasticizer was increased. What this means, of course, is that the raw polymer, already highly elastic, has become more elastic with the addition of the solvent plasticizer. In the case of the immiscible dipolymer systems prepared with GR-I and the low molecular weight oily polymer plasticizer, the post swell or elasticity of the extruded tube has fallen off rapidly as the concentration of oily plasticizer was increased. It has approached very soon the range of excellent extrusion performance, which performance can be obtained only with systems characterized by high plasticity and low elasticity.

In addition, the tubes formed from the mixture containing the low molecular weight oily copolymer had truer dimensions, that is, the tube wall was thinner, the outer contour was smoother and rounder, and the central hole was circular.

For a given polymer or polymer system, the swell of the formed tube will be increased as the rate of extrusion is increased. This is just another way of saying that the elastic-plastic tendencies of polymer systems, as they are measured by deformation studies, are dependent on the rate of stress application. From this, it might be expected that for the GR-I-low molecular weight oily copolymer system shown above, slower rates of extrusion would be obtained than were obtained for the GR-I hydrocarbon solvent system. That this was not the case is shown in the following table: (number designation of mixtures refers to mixtures cited above).

| Mixture | Rate of Extrusion (Inches/Min.) | Mixture | Rate of Extrusion (Inches/Min.) |
|---|---|---|---|
| A-1946-1 | 30.0 | A-1947-1 | 39.5 |
| A-1946-2 | 33.0 | A-1947-2 | 47.8 |
| A-1946-3 | 31.2 | A-1947-3 | 64.1 |
| A-1946-4 | 31.2 | A-1947-4 | 73.2 |
| A-1946-5 | 33.0 | | |

As can be seen, the rate of extrusion has remained substantially constant over the whole range of the hydrocarbon solvent concentrations given above. With low molecular weight oily polymer, however, the rate of extrusion increased sharply as the concentration of the oily polymer was increased.

The amount of oily viscous low molecular butadiene-acrylonitrile copolymer plasticizer which may be used varies between about 5 parts by weight to 50 parts by weight per 100 parts by weight of the polydiene-styrene copolymer or polydiene-olefin copolymer. If the polydiene-olefin copolymer is not highly unsaturated, having an iodine value below about 50, some difficulty may arise in the curing or vulcanizing of the polydiene-olefin copolymer if too much of the butadiene-acrylonitrile plasticizer is used and therefore for best results the amount of the oily copolymer is maintained between about 5 and 10 parts by weight per 100 parts by weight of the polydiene-olefin copolymer. However, where the product is used in instances where the curing is not a factor or where more unsaturated diene-olefin polymers are employed, amounts up to about 30 parts by weight of the oily copolymer per 100 parts by weight of the polydiene-olefin copolymer may be used. The intrinsic viscosity of the oily viscous butadiene-acrylonitrile copolymer which is useful as a plasticizer or softener in this invention may vary between about 0.15 to 0.6 and its kinematic viscosity is between about 5000 and 20,000 centistokes at 212° F.

If the oily polymer plasticizer has an intrinsic viscosity much below the lower limit given as, for example, one having a kinematic viscosity of about 250 centistokes at 212° F., it is unsuited for this process because it exudes or bleeds from the GR–I or GR–S polymer. If high molecular weight butadiene-acrylonitrile polymer such as standard Perbunan-26 is used as a plasticizer, no processing improvements are obtained with either GR–I or GR–S, the extrusion rate being low and the elastic swell being high. From this it will be seen that the intrinsic viscosity range of the oily polymer plasticizer is important for obtaining the improved results flowing from the use of the process of the present invention.

The extruded or milled material containing the plasticizer of this invention and the polydiene-aromatic olefin may be cured or vulcanized to produce rubbery products where the plasticizer is used in the range above given.

The addition of fillers, such as carbon blacks and clays, and of zinc oxide, etc. is made much easier with previous addition of oily polymer coplasticizer. The tendency for the stock to lace during these additions disappears. Because of the active, rolling bank and the even, smooth band, better dispersion of such materials is obtained and less time is required to complete the mix.

The oily butadiene-acrylonitrile polymer plasticizer may also be used for plasticizing polydienes, such as polybutadiene, polyisoprene, natural rubber, and the like.

While low temperatures are preferred during milling, improved results are obtained with the plasticizers of the present invention at the temperatures used in the milling of the particular material. The temperature during milling may range between about 95° F. and 400° F., with the range of 95° F. to 150° F. being preferred.

While there are given several embodiments of this invention, it is to be understood that various modifications and changes may be made without departing from the spirit of the invention.

It is claimed:

1. A composition of matter comprising 100 parts by weight of a rubbery hydrocarbon polymer of an unsaturated aliphatic hydrocarbon material containing at least one double bond and about 5 to 50 parts by weight of a plasticizing or softening agent which does not have a solvating effect on said polymer and which comprises a viscous normally liquid copolymer of a conjugated $C_4$–$C_6$ diolefin and a nitrile selected from the group consisting of acrylonitrile and methacrylonitrile having a molecular weight in the range of an intrinsic viscosity between 0.15 and 0.6.

2. A composition of matter comprising 100 parts by weight of a synthetic rubbery hydrocarbon polymer of a conjugated diolefinic material and 5 to 50 parts by weight of a softening or plasticizing agent comprising a normally liquid viscous copolymer of 60 to 80% of butadiene with 40 to 20% of acrylonitrile having an intrinsic viscosity in the range between 0.15 and 0.6.

3. A composition of matter comprising a rubbery hydrocarbon polymer of a conjugated diolefin and a plasticizing agent in an amount in the range between 5 and 50 parts by weight per 100 parts by weight of said polymer, said plasticizing agent comprising a normally liquid butadiene-acrylonitrile copolymer having an intrinsic viscosity between 0.15 and 0.6.

4. A composition according to claim 3 wherein the rubbery polymer comprises isobutylene copolymerized with a $C_4$–$C_{10}$ conjugated diolefin and the plasticizing agent is used in an amount in the range between 5 and 30 parts by weight per 100 parts by weight of said polymer.

5. A composition of matter comprising 100 parts by weight of a synthetic rubbery copolymer of a major proportion of a conjugated diolefin of from 4 to 6 carbon atoms per molecule and a minor proportion of styrene and about 5 to 30 parts by weight of a plasticizing agent comprising a viscous normally oily copolymer of 60 to 80% of butadiene and 40 to 20% of acrylonitrile having a molecular weight in the range of an intrinsic viscosity of 0.15 to 0.6.

6. A composition of matter comprising a synthetic rubbery copolymer of a major proportion of isobutylene and a minor proportion of isoprene and 5 to 10 parts of a plasticizer comprising a normally oily viscous butadiene-acrylonitrile copolymer having an intrinsic viscosity in the range between about 0.15 and 0.6.

7. A composition of matter comprising 100 parts by weight of a synthetic rubber-like copolymer of an olefin and a diolefin and 5 to 30 parts by weight of a plasticizer comprising a low molecular weight normally liquid viscous copolymer of a conjugated $C_4$–$C_6$ diolefin and a nitrile selected from the group consisting of acrylonitrile and methacrylonitrile having an intrinsic viscosity not less than about 0.15.

8. A process for improving the workability of a synthetic rubbery hydrocarbon polymer of olefinic material containing at least one double bond which comprises masticating the polymer at a temperature between about 95° F. and 400° F., together with a plasticizing agent comprising a normally liquid viscous butadiene-acrylonitrile copolymer having an intrinsic viscosity in the range between 0.15 and 0.6 to produce a homogeneous mixture.

9. A process for improving the workability of a synthetic rubbery hydrocarbon copolymer of a conjugated diolefin and an olefinic material copolymerizable therewith which comprises adding to said copolymer 5 to 30 parts by weight per 100 parts by weight of said copolymer of a normally liquid viscous copolymer of a major proportion of butadiene and a minor proportion of acrylonitrile having an intrinsic viscosity in the range between 0.15 and 0.6 and milling the resulting mixture at a temperature between 95° F. and 400° F. to produce a homogeneous mixture.

10. A process for improving the mill behavior of synthetic rubber-like copolymers of a major proportion of a $C_4$ to $C_6$ conjugated diolefin and a minor proportion of a styrene which comprises adding from 5 to 50% by weight of an oily viscous butadiene-acrylonitrile copolymer having an intrinsic viscosity in the range between 0.15 and 0.6 and subjecting the resulting mixture to a mastication treatment at a temperature between 95 and 400° F. to produce a homogeneous mixture.

11. A process for improving the workability of a synthetic rubbery copolymer of a major proportion of butadiene and a minor proportion of styrene which comprises adding to 100 parts by weight of said copolymer 5 to 30 parts by weight of a normally liquid viscous emulsion copolymer of 60 to 80% of butadiene and 40 to 20% of acrylonitrile having an intrinsic viscosity in the range between 0.15 and 0.6 and subjecting the resulting mixture to a kneading and milling action at a temperature between 95 and 150° F. to produce a homogeneous mixture.

12. A process for improving the workability of a synthetic rubbery hydrocarbon polymer of a major portion of isobutylene and a minor portion of isoprene which comprises adding to said polymer a plasticizing amount of a viscous butadiene-acrylonitrile copolymer having an intrinsic viscosity in the range between about 0.15 and 0.6 and subjecting the resulting mixture to a mastication treatment at a temperature in the range between about 95° F. and 400° F. to produce a homogeneous mixture.

13. A process according to claim 12 wherein the temperature during mastication is within the range between 95° F. and 150° F.

ALBERT M. GESSLER.

REFERENCES CITED

The following references are of record in the file of this patent:

UNITED STATES PATENTS

| Number | Name | Date |
| --- | --- | --- |
| 2,217,631 | Wolfe | Oct. 8, 1940 |

FOREIGN PATENTS

| Number | Country | Date |
| --- | --- | --- |
| 705,104 | Germany | Apr. 17, 1941 |